US009154506B1

(12) United States Patent
Bhattacharya et al.

(10) Patent No.: US 9,154,506 B1
(45) Date of Patent: Oct. 6, 2015

(54) SYSTEM AND METHOD FOR SECURE DATA GENERATION AND TRANSMISSION

(71) Applicant: Wipro Limited, Bangalore (IN)

(72) Inventors: Sourav Sam Bhattacharya, Fountain Hills, AZ (US); Asharaf Mohammed, Bellevue, WA (US); Lakshmanan Perichiappan, Chennai (IN)

(73) Assignee: Wipro Limited, Bangalore (IN)

( * ) Notice: Subject to any disclaimer, the term of this patent is extended or adjusted under 35 U.S.C. 154(b) by 0 days.

(21) Appl. No.: 14/267,973

(22) Filed: May 2, 2014

(30) Foreign Application Priority Data

Mar. 20, 2014  (IN) ............................ 1462/CHE/2014

(51) Int. Cl.
*H04L 29/06* (2006.01)
*G06F 21/62* (2013.01)
*G06F 17/30* (2006.01)

(52) U.S. Cl.
CPC .......... *H04L 63/10* (2013.01); *G06F 17/30634* (2013.01); *G06F 21/6254* (2013.01)

(58) Field of Classification Search
CPC .............. H04L 63/10; G06F 17/30634; G06F 21/6254
USPC ........................................................... 726/1
See application file for complete search history.

(56) References Cited

U.S. PATENT DOCUMENTS

| 7,634,651 | B1 * | 12/2009 | Gerde et al. ................... 713/153 |
| 7,673,147 | B2 | 3/2010 | Moghe et al. |
| 8,117,221 | B2 * | 2/2012 | Elteto et al. ................... 707/757 |
| 2009/0158054 | A1 * | 6/2009 | Dijk et al. ...................... 713/189 |
| 2011/0179011 | A1 * | 7/2011 | Cardno et al. ................ 707/709 |
| 2011/0277037 | A1 * | 11/2011 | Burke et al. .................... 726/26 |
| 2012/0066769 | A1 * | 3/2012 | Latchem et al. ................ 726/26 |

OTHER PUBLICATIONS

Digify, "Files sent using Digify are copy-protected and self-destructing. Track and unshare them even after sending.", Digify, last accessed Aug. 3, 2015, <www.digify.com>.
King Money, "Resources to create an online business and learn how to earn money on the internet", King Money, last accessed Aug. 3, 2015 <http://www.kingmoney.net/offline/create-messages-self-destruct-google-docs>.
Privnote, "Send notes that will self-destruct after being read", Privnote, last accessed Aug. 3, 2015, <https://privnote.com>.

(Continued)

*Primary Examiner* — Michael S McNally
(74) *Attorney, Agent, or Firm* — LeClairRyan, a Professional Corporation

(57) ABSTRACT

Systems and methods for secure generation and transmission of data over a communication network are described herein. In one example, the method comprises receiving a query from the user and retrieving raw data from a data repository based on the received query. The method further comprises generating an obfuscated query and randomizing at least one of a table and a field of the raw data to produce a randomized schema. In one example, the method further comprises preprocessing the raw data based on the received query and inserting the preprocessed data into the randomized schema. Thereafter a data payload is generated by inserting the obfuscated query and the randomized schema into a data carrier, wherein the data payload is to be transferred to at least one client device for processing.

19 Claims, 5 Drawing Sheets

(56) References Cited

OTHER PUBLICATIONS

Document Tracking Service, "Self-Destructing-Email offers comprehensive tracking", Document Tracking Service, last accessed Aug. 8, 2015, <http://www.self-destructing-email.com/self-destructing-email/pmdoctrack.asp>.

Adobe Acrobat, "The next version of Acrobat is here", Adobe Document Cloud, Adobe Acrobat DC, last accessed Aug. 3, 2015, <www.acrobat.com>.

* cited by examiner

SYSTEM AND METHOD FOR SECURE DATA GENERATION AND TRANSMISSION

This application claims the benefit of Indian Patent Application No. 1462/CHE/2014 filed Mar. 20, 2014, which is hereby incorporated by reference in its entirety.

TECHNICAL FIELD

The present subject matter relates to access control of data, and, particularly but not exclusively, to secure generation and transmission of data over a communication network.

BACKGROUND

Unauthorized access to documents and files are damaging to organizations and may cause significant corporate risks of varying forms, such as brand risk, corporate trade secret disclosure risk, financial risk, legal compliance risk, and operational and productivity risk. In today's world most enterprises carry out their business in a collaborative environment wherein data is shared between multiple users, either within or outside the organization, at different geographical regions. For example, within the organization business proposals, corporate presentations, market research and prediction data, and so on may be shared between various stakeholders who may be located at different offices situated at different geographical regions. Similarly data may be shared between different organizations, for example, between service providers and clients. Most of the information in this data may be confidential to the organizations. Thus, organizations attempt to devise various techniques to mitigate the risk that the sensitive or confidential data contained in the data may be compromised.

Generally organizations use various encryption techniques to encrypt sensitive data to prevent unauthorized access. In addition to encryption, access to sensitive data may also be controlled through the use of access control lists (ACLs) wherein the ACLs specifies which users have access to the sensitive data and the level of access or permissions, such as read, write, delete and print, that users have to the sensitive data.

SUMMARY

Disclosed herein are systems and methods for secure generation and transmission of data over a communication network. In one example, the system for secure generation and transmission of data over a communication network comprise a processor, a memory communicatively coupled to the processor. The system further comprises a processor, a memory communicatively coupled to the processor, wherein the memory stores processor-executable instructions, which, on execution, cause the processor to generate a key based on a passphrase received from a user, receive a query from the user, retrieve raw data from a data repository based on the received query, generate an obfuscated query based on the received query and the generated key, randomize at least one of a table and a field of the raw data based on the generated key to produce a randomized schema, pre-process the raw data based on the received query, wherein the pre-processing does not exceed a user-defined threshold of execution of the received query, insert the preprocessed data into the randomized schema, and generate a data payload by inserting the obfuscated query and the randomized schema into a data carrier, wherein the data payload is to be transferred to at least one client device for processing and wherein the data carrier comprises one or more data packets.

In an aspect of the invention, the method for secure generation and transmission of data over a communication network comprise generating a key based on a passphrase received from a user, receiving a query from the user, retrieving raw data from a data repository based on the received query, generating an obfuscated query based on the received query and the generated key, randomizing at least one of a table and a field of the raw data based on the generated key to produce a randomized schema, pre-processing the raw data based on the received query, wherein the pre-processing does not exceed a user-defined threshold of execution of the received query, inserting the preprocessed data into the randomized schema; and generating a data payload by inserting the obfuscated query and the randomized schema into a data carrier, wherein the data payload is to be transferred to at least one client device for processing and wherein the data carrier comprises one or more data packets.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles. In the figures, the left-most digit(s) of a reference number identifies the figure in which the reference number first appears. The same numbers are used throughout the figures to reference like features and components. Some embodiments of system and/or methods in accordance with embodiments of the present subject matter are now described, by way of example only, and with reference to the accompanying figures, in which.

Figure 1A:
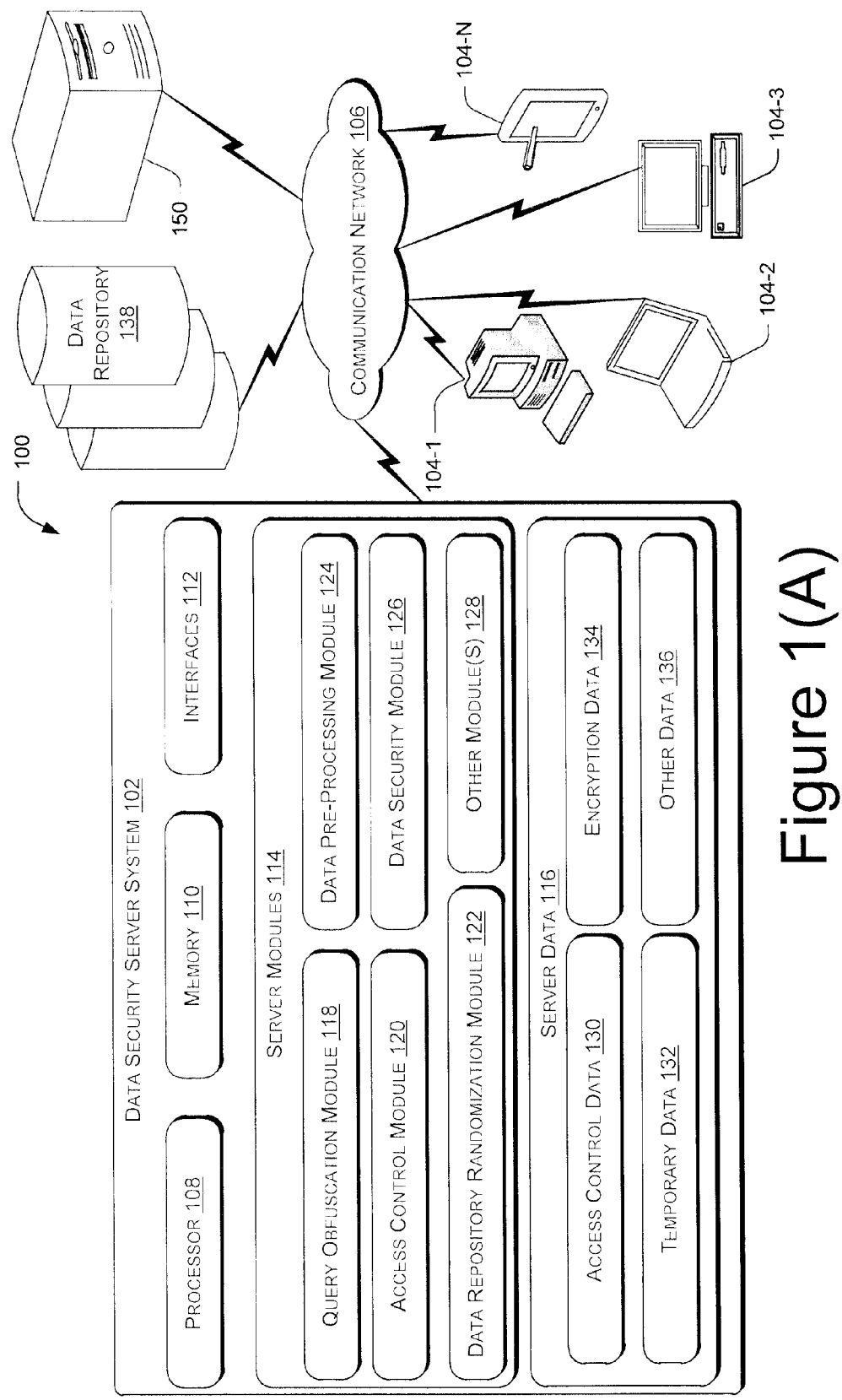
FIG. 1(A) illustrates a network environment implementing a data security server system for secure generation and transmission of data over a communication network, according to some embodiments of the present subject matter.

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and executed by a computer or processor, whether or not such computer or processor is explicitly shown.

DETAILED DESCRIPTION

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

Systems and methods for secure generation and transmission of data over a communication network are described herein. The systems and methods may be implemented in a variety of computing systems. The computing systems that can implement the described method(s) include, but are not limited to a server, a desktop personal computer, a notebook or a portable computer, a mainframe computer, and in a mobile computing environment. Although the description herein is with reference to certain computing systems, the systems and methods may be implemented in other computing systems, albeit with a few variations, as will be understood by a person skilled in the art.

Conventionally, the data security systems implement various kinds of encryption techniques and access control techniques to protect a document which includes sensitive data. However, the document is already created and stored in a storage device which leads to chances of unauthorized access to the document by circumventing the security measures and access control techniques put in place to protect the document. Further, in many cases, there may be symptoms of the sensitive document being under attack, for example, repeated unsuccessful access attempts. In such cases, most of the conventional data security systems do not take necessary steps to protect the document which would prevent the loss or leakage of sensitive data.

The present subject matter discloses systems and methods for secure generation and transmission of data over a communication network. The principles of the present subject matter are described with the help of an example in which a confidential document is generated by the organization by processing raw data, stored in a data repository, and is transmitted to a client of the organization. In said example, a stakeholder or a user of the organization feeds a passphrase to a data security server (DSS) system. Based on the passphrase, the DSS system uses commercially available cryptographic techniques to generate a key. Thereafter, the DSS system prompts the user to enter a query which is to be run on the data repository to generate the document. On receiving the query, the DSS system retrieves the raw data from the data repository. As would be understood by a person skilled in the art, a query generally involves a subset of the databases or tables stored in the data repository and may not involve all the databases or tables stored in the data repository. In one example, the DSS system would retrieve only the data which is necessary for executing the query. This would reduce computational resources required for executing the query, such as processing power and memory. For example, the DSS system may parse the query to identify the databases and/or tables on which the query is to be run, any joining operation that may have to be performed on a plurality of tables and/or databases, any filtering condition and so on to ascertain the raw data which is to be retrieved for executing the query.

Thereafter, the DSS system pre-processes the raw data by executing the query on the raw data, such that the pre-processing does not exceed a user-defined threshold of execution of the query. For example, the DSS system may terminate the execution of the query after it is 'X'% complete wherein X is a numeric value based on the user-defined threshold. The DSS system then randomizes at least one of a table and a field of the raw data based on the generated key to produce a randomized schema. The DSS system inserts the pre-processed data into the randomized schema. As a sequential or parallel operation, the DSS system generates an obfuscated query by processing the query and the generated key. Thereafter, the DSS system generates a data payload by inserting the obfuscated query and the randomized schema into a data carrier, wherein the data payload is to be transferred to the client. In one example, the DSS system may also segment the pre-processed data and insert the segmented data into the randomized schema for enhanced security as segmenting the pre-processed data makes it difficult to reconstruct the original raw data. Further, since the process of segmenting the pre-processed data is an one time data encoding technique, it is very difficult to break the encoding.

In another example, the DSS system may prompt the user to enter a distribution list for the document, wherein the distribution list comprises identifiers of at least one of a client user and/or a client device authorized to access the data by processing the data payload. The identifiers may be understood to be a unique characteristic feature associated with a client user/and or a client device. Example of the identifiers may include username of the client user; media access control (MAC) address of the client device, internet protocol (IP) address of the client device, and so on. In one implementation, the DSS system may analyze the distribution list to generate an access control list, wherein the access control list includes a first sub-list for access allowed white-list and a second sub-list for access disallowed black-list. In said implementation, the DSS system inserts the access control list to the data payload. Using access control lists facilitates the DSS system to restrict the access of the document to approved client users and/or on approved client devices only, resulting in higher security of the document and lower risks of leakage.

In one example, the DSS system may receive pre-defined data security rules received from the user and generate at least one of an access violation policy and a document destruction policy, based on the same. The access violation policy may mention the circumstances in which the organization deems the document to have been accesses by an unauthorized client user and/or on an unauthorized client device. The document destruction policy may mention the circumstances on occurrence of which the document would be destroyed by variously conventionally known techniques, such as securely deleting the document. For example, the organization may define the document destruction policy such that the document is destroyed if the number of unauthorized attempts or unsuccessful attempts to access the document within a specified time period, i.e., the frequency of the unauthorized attempts or unsuccessful attempts exceeds a user-defined number. In said example, the DSS system inserts the at least one of the access violation policy and the document destruction policy to the data payload. This facilitates DSS system to reduce the chances of unauthorized access of the document.

On completion of the generation of the data payload, the DSS system transmits, over a communication network, the data payload to a data security client (DSC) system for processing. In one example, the DSS system may transmit the data payload using a secure communication protocol, such as secure hypertext transfer (HTTPS) protocol and secure file transfer protocol (SFTP) to reduce chances of unauthorized access of the document during transmission by intercepting the data payload.

On receipt of the data payload by the DSC system, the client user is prompted to input a secure passkey. The passkey may be understood to be analogous to the passphrase entered by the user of the organization. The DSC system processes the data payload to extract the obfuscated query and data from the data payload wherein at least one of a table and a field of the data has been randomized. The DSC system processes the obfuscated query, based on the secure passkey, and reconstructs the actual executable query. The DSC system also re-arranges the at least one of the table and at least one of the field of the data which is randomized and reconstructs the pre-processed data. Thereafter, the DSC system executes the executable query on the pre-processed data and generates a file or a document containing the requisite information. The DSC system then provides access of the document to at least one of the client user and/or on at least one of the client devices.

In one implementation, the DSC system may process the data payload to extract any access control list from the data payload. The DSC system then parses the access control list to identify an access allowed white-list, and an access disallowed black-list of the client users authorized to and client users not authorized to access the document respectively. Thereafter, the DSC system provides the access of or denies access to the document based on the access control list. In one example, the DSC system may further extract at least one of an access allowed white-list and an access disallowed black-list from the access control list. Thereafter, the DSC system provides access of the document to one or more client users mapped on the white-list and denies access of the file to one or more client users mapped on the black-list.

In one example, the DSC system may further retrieve an access violation policy and based on the same determine any unauthorized attempts made to access the document. The unauthorized attempts may include attempts by unauthorized client users and/or attempts made on unauthorized client devices. In said example, the DSC system may also retrieve the document destruction policy and destroy the document on determining the number of unauthorized attempts to have exceeded a user-defined threshold or determining that the frequency of unauthorized attempts has exceeded a user-defined threshold. In one example, the DSC system may implement any conventionally known secure deletion techniques, such as by a plurality of sector overwrites, to ensure that the probability of recovering the document by performing various commercially available data recovery operations on the storage device is minimized. Thus, the present subject matter facilitates secure generation and transmission of data or documents over a communication network.

The working of the systems and methods for secure generation and transmission of data over a communication network is described in greater detail in conjunction with FIG. 1-4. It should be note that the description and drawings merely illustrate the principles of the present subject matter. It will thus be appreciated that those skilled in the art will be able to devise various arrangements that, although not explicitly described or shown herein, embody the principles of the present subject matter and are included within its spirit and scope. Furthermore, all examples recited herein are principally intended expressly to be only for pedagogical purposes to aid the reader in understanding the principles of the present subject matter and are to be construed as being without limitation to such specifically recited examples and conditions. Moreover, all statements herein reciting principles, aspects, and embodiments of the present subject matter, as well as specific examples thereof, are intended to encompass equivalents thereof. While aspects of the systems and methods can be implemented in any number of different computing systems environments, and/or configurations, the embodiments are described in the context of the following exemplary system architecture(s).

Figure 1B:
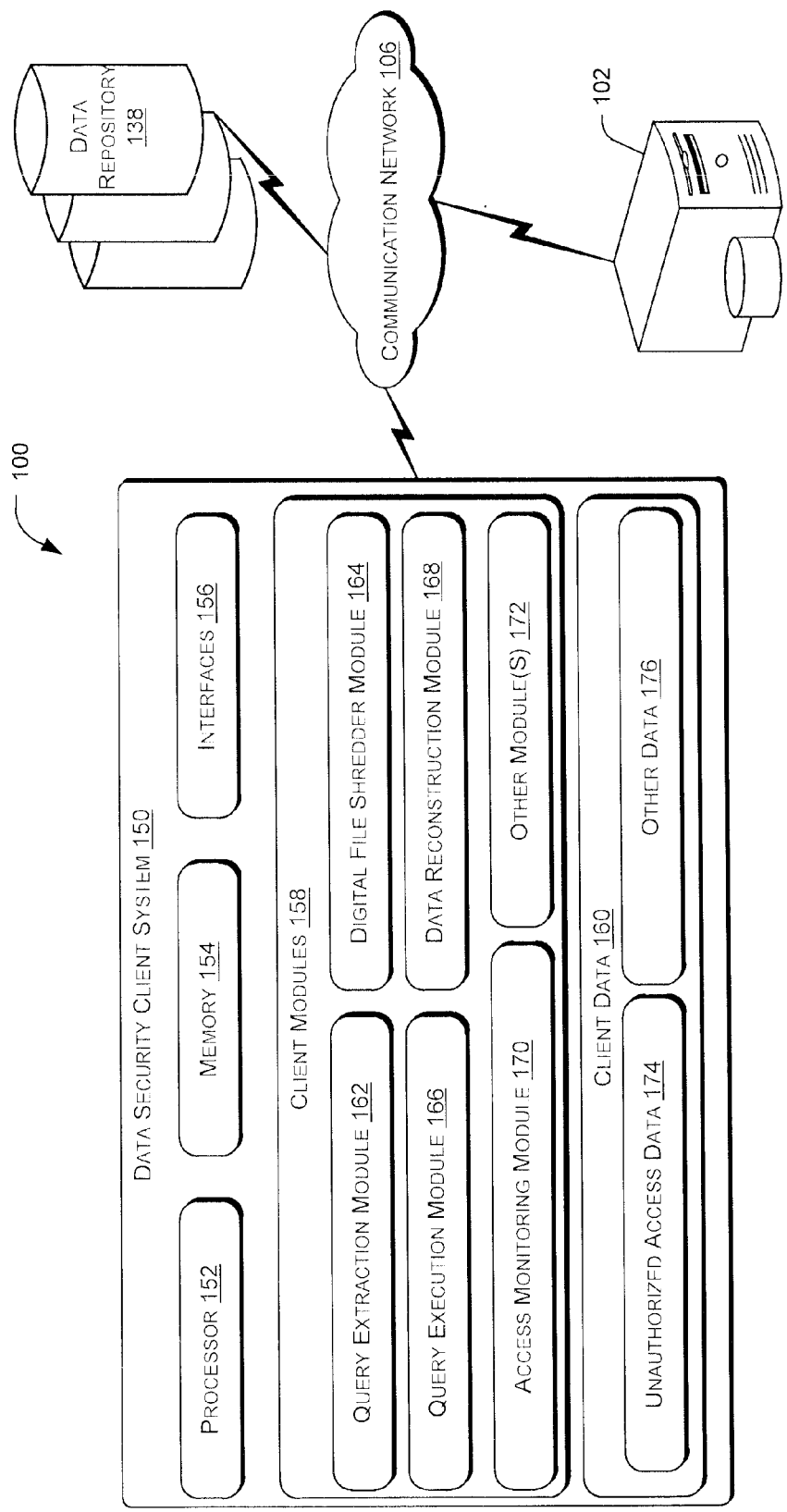
FIG. 1(B) illustrates a network environment implementing a data security client system for secure generation and transmission of data over a communication network, according to some embodiments of the present subject matter.

FIG. 1(A) illustrates a network environment 100 implementing a data security server (DSS) system 102 for secure generation and transmission of data over a communication network, according to some embodiments of the present subject matter. FIG. 1(B) illustrates the network environment 100 implementing a data security client (DSC) system 150 for secure generation and transmission of data over a communication network, according to some embodiments of the present subject matter. In one implementation, the DSS system 102 and the DSC system 150 may be included within an existing information technology infrastructure of an organization. For example, the DSS system 102 and the DSC system 150 may be interfaced with the existing content and document management system(s), database and file management system(s), of the organization.

The DSS system 102 and the DSC system 150 may be implemented in a variety of computing systems, such as a laptop computer, a desktop computer, a notebook, a workstation, a mainframe computer, a server, a network server, and the like. It will be understood that both the DSS system 102 and the DSC system 150 may be accessed by users through one or more client devices 104-1, 104-2, 104-3, 104-N, collectively referred to as client devices 104. Examples of the client devices 104 include, but are not limited to, a desktop computer, a portable computer, a mobile phone, a handheld device, a workstation. The client devices 104 may be used by various stakeholders or end users of the organization, such as project managers, departmental heads and administrative heads. As shown in the figure, such client devices 104 are communicatively coupled to the DSS system 102 and the DSC system 150 through a network 106 for facilitating one or more end users to access and/or operate the DSS system 102 and the DSC system 150.

The network 106 may be a wireless network, wired network or a combination thereof. The network 106 can be implemented as one of the different types of networks, such as intranet, local area network (LAN), wide area network (WAN), the internet, and such. The network 106 may either be a dedicated network or a shared network, which represents an association of the different types of networks that use a variety of protocols, for example, Hypertext Transfer Protocol (HTTP), Transmission Control Protocol/Internet Protocol (TCP/IP), Wireless Application Protocol (WAP), etc., to communicate with each other. Further, the network 106 may include a variety of network devices, including routers, bridges, servers, computing devices, storage devices, etc.

In one implementation, the DSS system 102 includes a processor 108, a memory 110 coupled to the processor 108 and interfaces 112, whereas the DSC system 150 includes a processor 152, a memory 154 coupled to the processor 152 and interfaces 156. The processor 108 and the processor 152 may be implemented as one or more microprocessors, microcomputers, microcontrollers, digital signal processors, central processing units, state machines, logic circuitries, and/or any devices that manipulate signals based on operational instructions. Among other capabilities, the processor 108 and the processor 152 are configured to fetch and execute computer-readable instructions stored in the memory 110 and the memory 154 respectively. The memory 110 and the memory 154 can include any non-transitory computer-readable medium known in the art including, for example, volatile memory (e.g., RAM), and/or non-volatile memory (e.g., EPROM, flash memory, etc.).

The interface(s) 112 and the interfaces 156 may include a variety of software and hardware interfaces, for example, a web interface, a graphical user interface, etc., allowing the DSS system 102 and the DSC system 150 to interact with the client devices 104. Further, the interface(s) 112 and the interfaces 156 may enable the DSS system 102 and the DSC system 150 respectively to communicate with other computing devices. The interface(s) 112 and the interfaces 156 can facilitate multiple communications within a wide variety of networks and protocol types, including wired networks, for example LAN, cable, etc., and wireless networks such as WLAN, cellular, or satellite. The interface(s) 112 and the interfaces 156 may include one or more ports for connecting a number of devices to each other or to another server.

In one example, the DSS system 102 includes modules 114 and data 116. In one embodiment, the modules 114 and the data 116 may be stored within the memory 110. In one implementation, the DSC system 150 includes modules 158 and data 160. In one example, the modules 158 and the data 160 may be stored within the memory 154.

In one example, the modules 114 and the modules 158, amongst other things, include routines, programs, objects, components, and data structures, which perform particular tasks or implement particular abstract data types. The modules 114 and the modules 158 may also be implemented as, signal processor(s), state machine(s), logic circuitries, and/or any other device or component that manipulate signals based on operational instructions. Further, the modules 114 and the modules 158 can be implemented by one or more hardware components, by computer-readable instructions executed by a processing unit, or by a combination thereof.

In one implementation, the modules 114 further include a query obfuscation module 118, an access control module 120, a data repository randomization module 122, a data pre-processing module 124, a data security module 126 and other modules 128. The other modules 128 may perform various miscellaneous functionalities of the DSS system 102. It will be appreciated that such aforementioned modules may be represented as a single module or a combination of different modules.

In one example, the data 116 serves, amongst other things, as a repository for storing data fetched, processed, received and generated by one or more of the modules 114. In one implementation, the data 116 may include, for example, access control data 130, temporary data 132, encryption data 134, and other data 136. In one embodiment, the data 116 may be stored in the memory 110 in the form of various data structures. Additionally, the aforementioned data can be organized using data models, such as relational or hierarchical data models. The other data 136 may be used to store data, including temporary data and temporary files, generated by the modules 114 for performing the various functions of the DSS system 102.

In one implementation, the modules 158 further include a query extraction module 162, a digital file shredder module 164, a query execution module 166, a data reconstruction module 168, an access control 170 and other modules 172. The other modules 172 may perform various miscellaneous functionalities of the DSC system 150. It will be appreciated that such aforementioned modules may be represented as a single module or a combination of different modules.

In one example, the data 160 serves, amongst other things, as a repository for storing data fetched, processed, received and generated by one or more of the modules 158. In one implementation, the data 160 may include, for example, unauthorized access data 174, and other data 176. In one embodiment, the data 160 may be stored in the memory 154 in the form of various data structures. Additionally, the aforementioned data can be organized using data models, such as relational or hierarchical data models. The other data 176 may be used to store data, including temporary data and temporary files, generated by the modules 154 for performing the various functions of the DSC system 150.

In one implementation, the DSS system 102 is communicatively coupled with a data repository 138. The data repository 138 may comprise one or more commercially available data storage media, such as compact discs, magnetic tapes, SATA disks, and so on. The data repository 138 may also implement various commercially available database management systems, such as Oracle™ Database, and Microsoft™ SQL Server. In one example, the data repository 138 stores confidential raw data which may be further processed to generate documents, such as reports and presentations, which are sensitive for the organization and/or for its clients. In one implementation, the data repository 138 may be implemented within the DSS system 102.

In operation, a user of the organization uses the data security module 126 to input a passphrase to the DSS system 102. The passphrase may be understood to be a series of alphabetical, numeric and/or special characters. Based on the received passphrase, the data security module 126 implements various commercially available cryptographic techniques, such as Data Encryption Standard (DES), Advanced Encryption Standard (AES), International Data Encryption Algorithm (IDEA), Blowfish, Secure and Fast Encryption Routine (SAFER), to generate a key.

Thereafter, the data security module 126 prompts the user to enter one or more queries which are to be run on the data repository 138 to generate a document which is to be shared with the client. The document may be understood to include spreadsheets, presentations, analytics reports, word-processor compatible files and so on.

On receiving the query, the data pre-processing module 124 retrieves the raw data from the data repository 138. In most examples the query would generally involve a subset of the databases or tables stored in the data repository 138. The data pre-processing module 124 would retrieve only the data which is necessary for executing the query. For example, the data pre-processing module 124 may parse the query, which may be in structured query language (SQL), to identify the names of the databases and/or tables, any joining operation that may have to be performed on a plurality of tables and/or databases, any filtering condition and so on to ascertain the raw data which is to be retrieved for executing the query. The data pre-processing module 124 also pre-processes the raw data by executing the query on the raw data, such that the pre-processing does not exceed a user-defined threshold of execution of the query. For example, the data pre-processing module 124 may terminate the execution of the query after it is 'X'% complete wherein X is based on the user-defined threshold.

On the termination of execution of the query, the data repository randomization module 122 randomizes at least one of a table and a field of the raw data based on the generated key to produce a randomized schema. The data repository randomization module 122 then inserts the pre-processed data into the randomized schema.

In a parallel or sequential operation, the query obfuscation module 118 generates an obfuscated query by processing the query and the generated key. In one example, the query obfuscation module 118 encodes or encrypts the received query using the generated key. Thereafter, the data security module 126 generates a data payload by inserting the obfuscated query and the randomized schema into a data carrier, wherein the data payload is to be transferred to the client. In some embodiments, the data security module 126 may also segment the pre-processed data and insert the segmented data into the randomized schema for enhanced security as segmenting the pre-processed data makes it difficult to reconstruct the original raw data.

In some other embodiments, the data security module 126 may prompt the user, by generating various user interfaces, to enter a distribution list for the document, wherein the distribution list comprises identifiers of at least one of a client user and a client device authorized to access the data by processing the data payload. As mentioned earlier, the identifiers may be understood to be a unique characteristic feature associated with a client user/and or a client device. Example of the identifiers may include username, media access control (MAC) address, internet protocol (IP) address, and so on. In one implementation, the data security module 126 may analyze the distribution list to generate an access control list, wherein the access control list includes a first sub-list for access allowed white-list and a second sub-list for access disallowed black-list. In said implementation, the data security module 126 inserts the access control list to the data payload. Using access control lists facilitates the data security module 126 to restrict the access of the document to approved client users and/or on approved client devices only leading to higher security of the document and lower risks of leakage.

In yet another example, the data security module 126 may receive pre-defined data security rules received from the user and generate at least one of an access violation policy and a document destruction policy, based on the same. The access violation policy may mention the circumstances in which the organization deems the document to have been accesses by an unauthorized client user and/or on an unauthorized client device. The document destruction policy may mention the circumstances on occurrence of which the document would be destroyed by variously conventionally known techniques, such as securely deleting the document. For example, the organization may define the document destruction policy such that the document is destroyed if the number of unauthorized attempts or unsuccessful attempts to access the document within a specified time period exceeds a user-defined number. In said example, the data security module 126 inserts the at least one of the access violation policy and the document destruction policy to the data payload. This reduces the chances of unauthorized access of the document.

On completion of the generation of the data payload, the data security module 126 transmits, over a communication network, the data payload to a DSC system 150 for processing. In one example, the data security module 126 may transmit the data payload using a secure communication protocol, such as HTTPS protocol and SFTP to reduce chances of unauthorized access of the document during transmission and man-in-the-middle attacks.

At the client side, the data reconstruction module 168 of the DSC system 150 receives the data payload and prompts the client user to input a secure passkey. On receiving the secure passkey, the data reconstruction module 168 re-arranges the at least one of the table and at least one of the field of the data which is randomized and reconstructs the pre-processed data which has transmitted. In a parallel or sequential operation, the query extraction module 162 processes the data payload, based on the secure passkey, to extract the obfuscated query. The query extraction module 162 processes the obfuscated query, based on the secure passkey, and reconstructs the actual executable query.

Thereafter, the query execution module 166 executes the executable query on the pre-processed data and generates a file or a document containing the requisite information. The access monitoring module 170 then provides access of the document to at least one of the client user and/or on at least one of the client devices.

In one implementation, the access monitoring module 170 may process the data payload to extract any access control list from the data payload. The access monitoring module 170 then parses the access control list to identify an access allowed white-list, and an access disallowed black-list of the client users authorized to and client users not authorized to access the document respectively. Thereafter, the access monitoring module 170 provides the access of or denies access to the document based on the access control list. In one example, the access monitoring module 170 may further extract at least one of an access allowed white-list and an access disallowed black-list from the access control list. Thereafter, the access monitoring module 170 provides access of the document to one or more client users mapped on the white-list and denies access of the file to one or more client users mapped on the black-list.

In one example, the access monitoring module 170 may further retrieve an access violation policy and based on the same determine any unauthorized attempts made to access the document. The unauthorized attempts may include attempts by unauthorized client users and/or attempts made on unauthorized client devices. In said example, the digital file shredded module 164 may also retrieve the document destruction policy and destroy the document on determining the number of unauthorized attempts to have exceeded a user-defined threshold or determining that the frequency of unauthorized attempts has exceeded a user-defined threshold. In one example, the digital file shredded module 164 may implement any conventionally known secure deletion techniques to ensure that the probability of recovering the document by performing various operations of the storage device is minimized.

In one implementation, the data security module 126 of the DSS system 102 may also include an identifier, associated with the DSS system 102, in the data payload. Example of such identifiers may include but are not limited to internet protocol (IP) address, media access control (MAC) address, asset numbers, username and hardware address. In said implementation, the data reconstruction module 168 of the DSC system 150 watermarks the generated document with the identifier of the DSS system 102 as well as notifies the DSS system 102 of the safe receipt and subsequent decryption of the document. In one example, the data reconstruction module 168 may notify the DSS system 102 as a return path, e-mail, reverse path Transmission Control Protocol (TCP) connection. This notification established a service level guarantee for the DSS system 102 to be informed upon each and every decryption occurrence. It also creates a layer of protection against unauthorized breach of data, so that the DSS system 102 has an unambiguous list of all the client devices 102 that have decrypted the document.

In one example, the digital file shredded module 164 may implement a "destroy no-later-than" technique. In this technique, the digital file shredded module 164 may destroy the document beyond a designated deadline. The value of designated deadline may be set by the user of the DSS system 102, for example in form of a timestamp, and encoded with the obfuscated query. On receiving the data payload at the DSC system 150, the digital file shredded module 164 may compare the current timestamp against the designated deadline and determine whether the designated deadline has been violated. On determining the designated deadline to have been violated, the designated deadline securely deletes the document. In one example, the DSS system 102 and the DSC system 150 may synchronize their clocks using any commercially available technique to implement the "destroy no-later-than" technique.

Thus, the present subject matter facilitates secure generation and transmission of data or documents over a communication network.

Thus, the DSS system 102 and the DSC system 150 implement a robust document security system in which the actual document is created at the time of consumption and hence, reduces the probability of being subject to unauthorized access. Further, the DSS system 102 and the DSC system 150 securely delete the document in case of repeated unsuccessful access attempts leading to enhanced security of the document. The detailed working of the DSS system 102 and the DSC system 150 is further explained in conjunction with the FIGS. 2-4.

Figure 2:
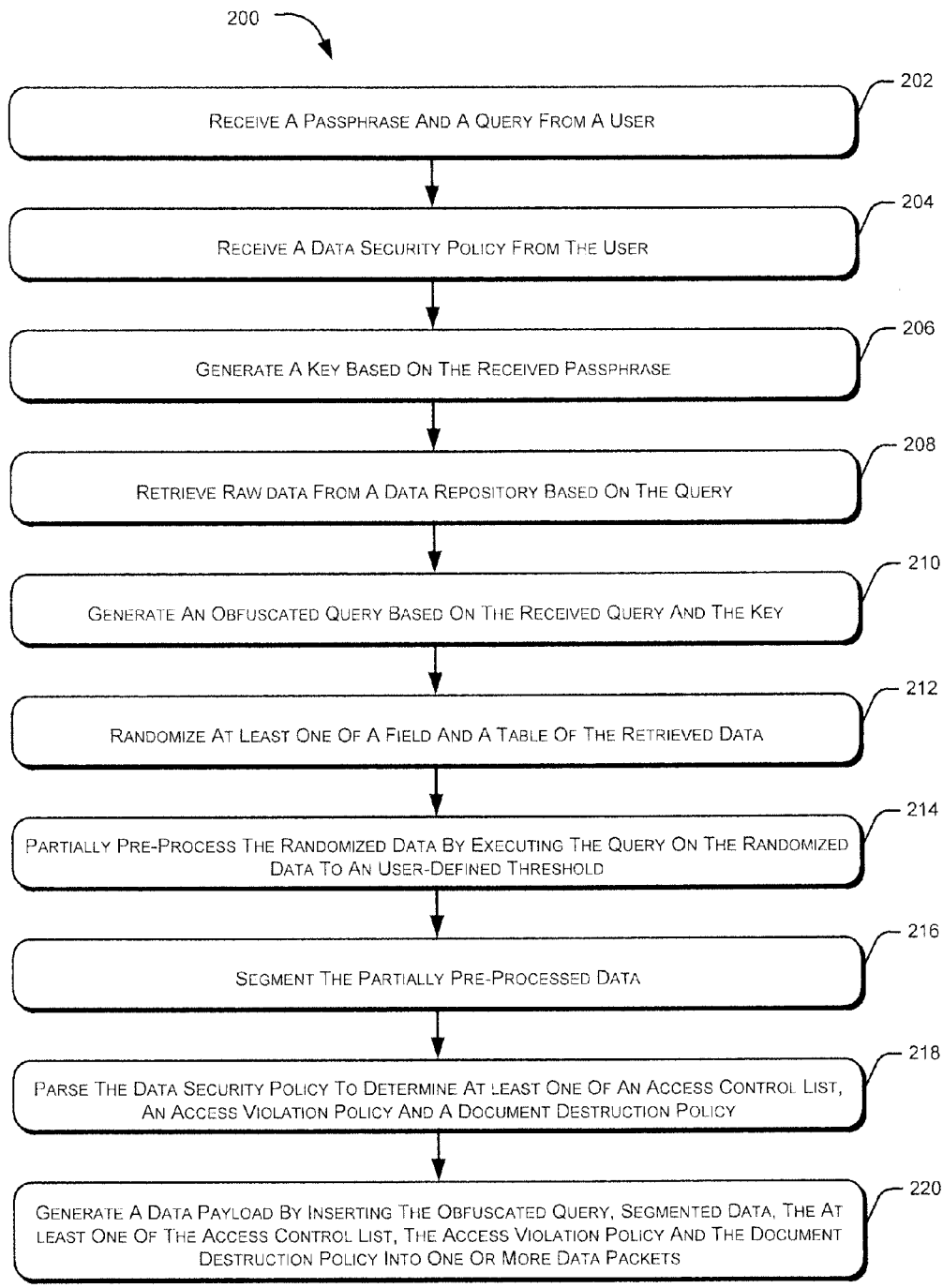
FIGS. 2 & 3 illustrates exemplary computer implemented methods for secure generation and transmission of data over a communication network, according to an embodiment of the present subject matter.
Figure 3:
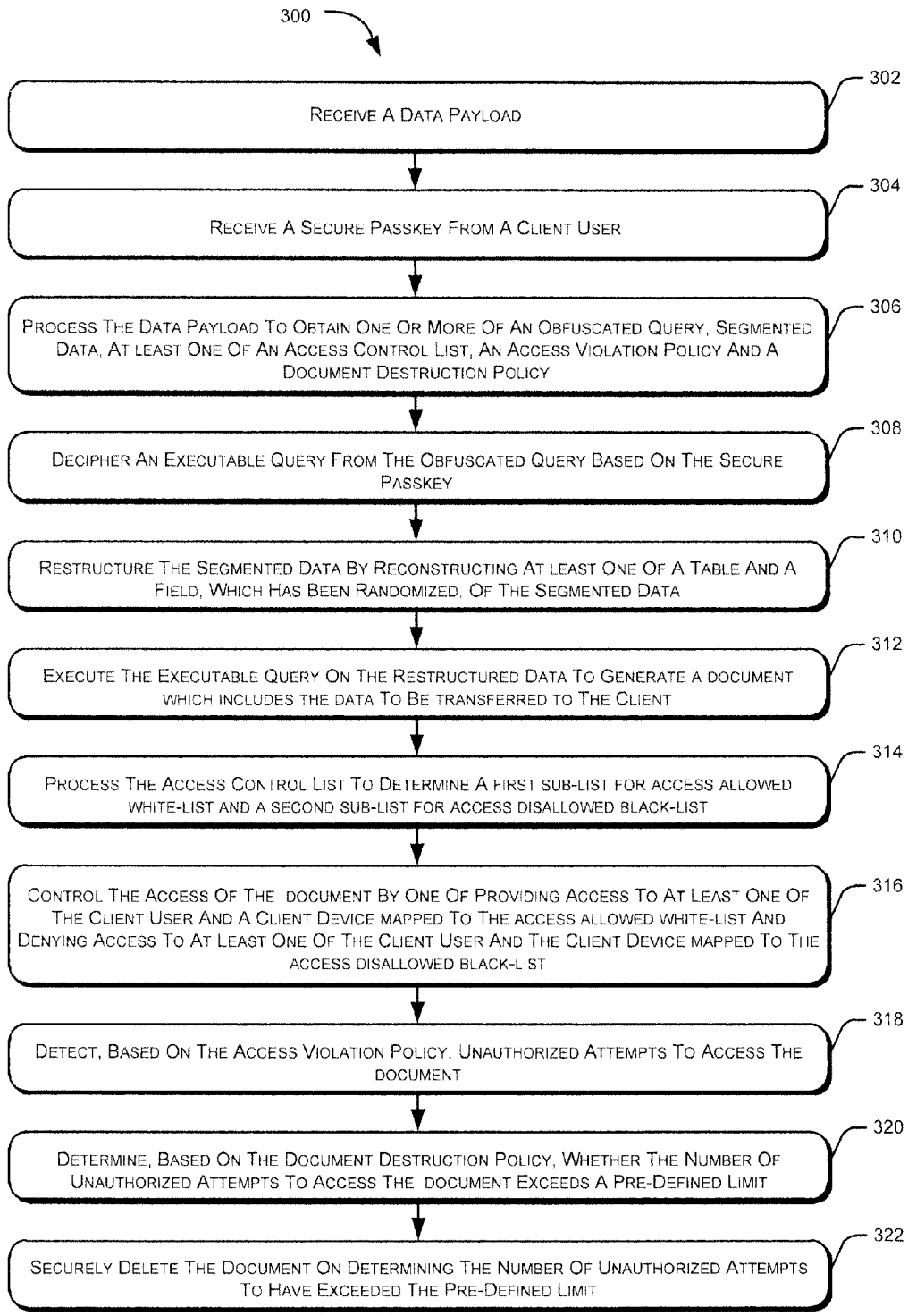

FIGS. 2 & 3 illustrates exemplary computer implemented methods 200 and 300 respectively for secure generation and transmission of data over a communication network, according to an embodiment of the present subject matter. The methods 200 and 300 may be described in the general context of computer executable instructions. Generally, computer executable instructions can include routines, programs, objects, components, data structures, procedures, modules, and functions, which perform particular functions or implement particular abstract data types. The methods 200 and 300 may also be practiced in a distributed computing environment where functions are performed by remote processing devices that are linked through a communication network. In a distributed computing environment, computer executable instructions may be located in both local and remote computer storage media, including memory storage devices.

The order in which the methods 200, and 300 is described is not intended to be construed as a limitation, and any number of the described method blocks can be combined in any order to implement the methods 200, and 300 or alternative methods. Additionally, individual blocks may be deleted from the methods 200 and 300 without departing from the spirit and scope of the subject matter described herein. Furthermore, the methods 200, and 300 can be implemented in any suitable hardware, software, firmware, or combination thereof.

With reference to method 200 as depicted in FIG. 2, as shown in block 202, a passphrase and a query is received from a user. In one implementation, the data security module 126 may generate various user interfaces to prompt the user to input the passphrase and the query.

At block 204 a data security policy is received from the user. In one example, the data security module 126 receives the data security policy from the user.

As illustrated in block 206, a key is generated based on the received passphrase. In one example, the data security module 126 generates the key based on the passphrase. For example, the data security module 126 may implement various commercially available cryptographic techniques to generate a key on being provided the passphrase as an input to the implemented cryptographic technique.

As depicted in block 208, raw data is retrieved from a data repository based on the query. In one example, the data pre-processing module 124 receives the raw data relevant for the execution of the query from the data repository 138.

As shown in block 210, an obfuscated query is generated based on the received query and the key. In one example, the query obfuscation module 118 obfuscates the received query, based on the key, so as to make the query difficult to decipher. The obfuscation makes the query difficult to tamper or reverse engineer. The obfuscation may also attempt to hide the logic implemented in the query which leads to protection of the business intelligence of the organization.

At block 212, at least one of a field and a table of the retrieved data is randomized. In one example, the data repository randomization module 122 randomizes at least one of the field and the table of the retrieved data. In one example, the data repository randomization module 122 may implement various scrambling techniques to randomize at least one of the field and the table of the retrieved data.

As illustrated in block 214, the randomized data is partially pre-processed by executing the query on the randomized data to a user-defined threshold. In one example, the data pre-processing module 124 executes the query on the randomized data to a user-defined threshold to generate the pre-processed data. Pre-processing the data reduces the time and the resource requirement, in terms of processing power and memory, at the client side for generating the document which is to be transferred.

As illustrated in block 216, the partially pre-processed data is segmented. In one example, the data security module 126 segments the partially pre-processed data.

As depicted in block 218, the data security policy is parsed to determine at least one of an access control list, an access violation policy and a document destruction policy. In one example, the data security module 126 parses the data security policy to determine at least one of an access control list, an access violation policy and a document destruction policy.

At block 220, a data payload is generated by inserting the obfuscated query, segmented data, the at least one of the access control list, the access violation policy and the document destruction policy into one or more data packets. In one example, the data security module 126 generates the payload by inserting the obfuscated query, segmented data, the at least one of the access control list, the access violation policy and the document destruction policy into one or more data packets.

With reference to method 300 as depicted in FIG. 3, as shown in block 302, a data payload is received. In one example, the data reconstruction module 168 receives the data payload at the client end.

As depicted in block 304, a secure passkey is received from a client user. In one example, the data reconstruction module 168 may generate various user interfaces to prompt the client user to enter a secure passkey which is analogous to the passphrase entered by the user at the end of the organization.

As illustrated in block 306, the data payload is processed to obtain one or more of an obfuscated query, segmented data, at least one of an access control list, an access violation policy and a document destruction policy. In one example, the query extraction module 162 processes the data payload to retrieve the obfuscated query. The data payload is further processed by the data reconstruction module 168 to retrieve the segmented data. In some embodiments, the access monitoring module 170 may also process the data payload to extract at least one of an access control list, an access violation policy and a document destruction policy.

At block 308, an executable query is deciphered from the obfuscated query based on the secure passkey. In one example, the query extraction module 162 processes the obfuscated query to regenerate the actual executable query which was provided as an input by the user at the organization end.

As shown in block 310, the segmented data is restructured by reconstructing at least one of a table and a field, which has been randomized, of the segmented data. In one example, the data reconstruction module 168 restructures the segmented data and restores or reverses the randomization of the at least one of the table and the field of the data.

As illustrated in block 312, the executable query is executed on the restructured data to generate a document which includes the data which is to be transferred. In one example, the query execution module 166 executes the executable query on the restructured data to generate the document which is to be delivered to the client.

As depicted in block 314, the access control list is processed to determine a first sub-list for access allowed white-list and a second sub-list for access disallowed black-list. In one example, the access monitoring module 170 processes the access control list to determine the first sub-list for access allowed white-list and the second sub-list for access disallowed black-list.

At block 316, the access of the document is controlled by one of providing access to at least one of the client user and/or a client device mapped to the access allowed white-list and denying access to at least one of the client user and/or the client device mapped to the access disallowed black-list. In one example, the access monitoring module 170 provides access of the document to the client users and/or on the client devices mapped on to the access allowed white-list. Further, the access monitoring module 170 denies access of the document to the client users and/or on the client devices mapped on to the access disallowed black-list.

As shown in block 318, unauthorized attempts to access the document are detected, based on the access violation policy. In one example, the access monitoring module 170 detect unauthorized attempts to access the document based on the access violation policy.

As illustrated in block 320, based on the document destruction policy, it is determined whether the number of unauthorized attempts to access the document exceeds a pre-defined limit. In one example, the access monitoring module 170 determines whether the number of unauthorized attempts to access the document exceeds a pre-defined limit.

At block 322, the document is securely deleted on determining the number of unauthorized attempts to have exceeded the pre-defined limit. In one example, the digital file shredded module 164, on determining the number of unauthorized attempts to have exceeded the pre-defined limit, securely deletes the document.

Computer System

Figure 4:
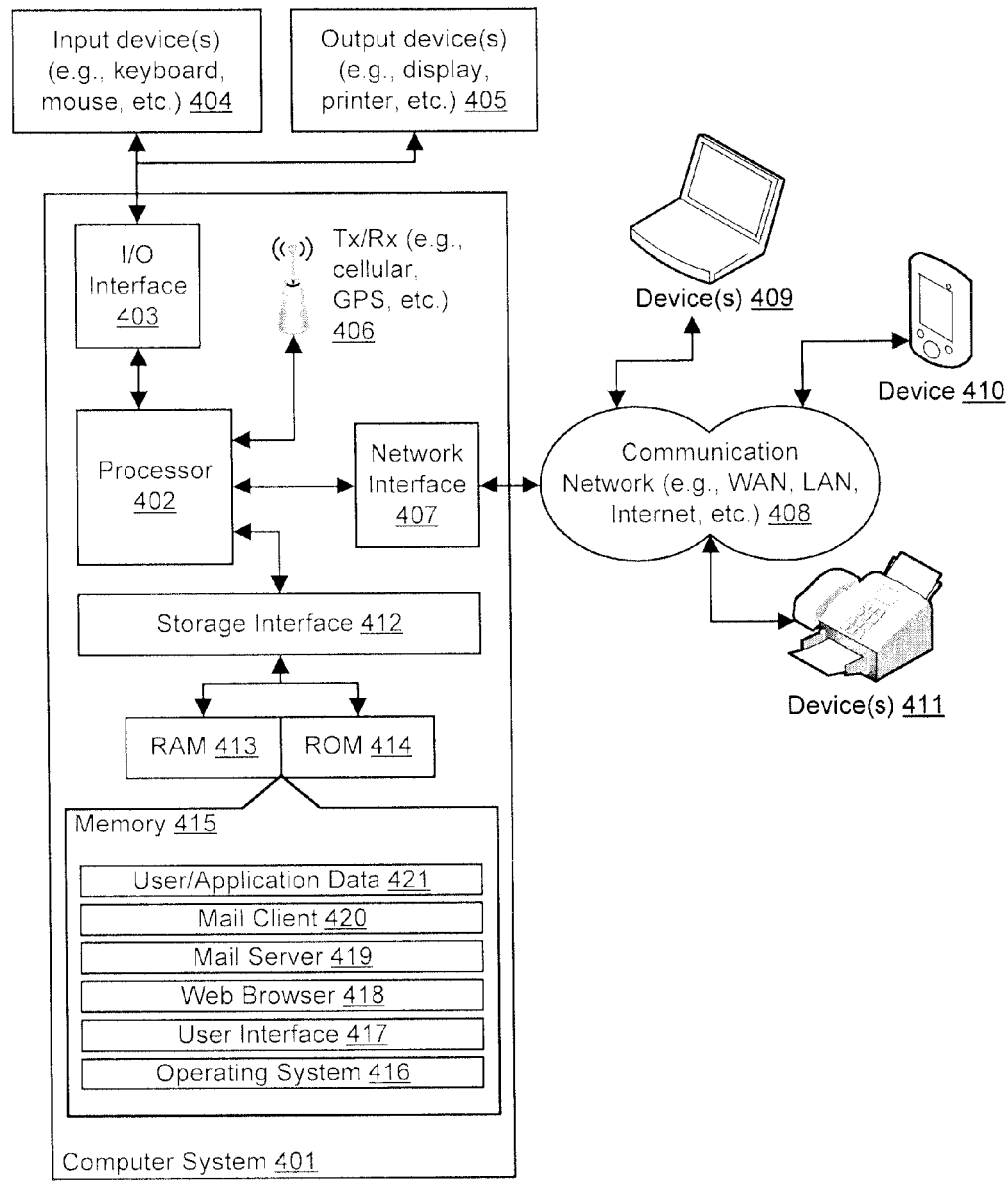
FIG. 4 is a block diagram of an exemplary computer system for implementing embodiments consistent with the present disclosure.

FIG. 4 is a block diagram of an exemplary computer system for implementing embodiments consistent with the present disclosure. Variations of computer system 401 may be used for implementing any of the devices presented in this disclosure. Computer system 401 may comprise a central processing unit ("CPU" or "processor") 402. Processor 402 may comprise at least one data processor for executing program components for executing user- or system-generated requests. A user may include a person, a person using a device such as such as those included in this disclosure, or such a device itself. The processor may include specialized processing units such as integrated system (bus) controllers, memory management control units, floating point units, graphics processing units, digital signal processing units, etc. The processor may include a microprocessor, such as AMD Athlon, Duron or Opteron, ARM's application, embedded or secure processors, IBM PowerPC, Intel's Core, Itanium, Xeon, Celeron or other line of processors, etc. The processor 402 may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

Processor 402 may be disposed in communication with one or more input/output (I/O) devices via I/O interface 403. The I/O interface 403 may employ communication protocols/methods such as, without limitation, audio, analog, digital, monaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.n/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using the I/O interface 403, the computer system 401 may communicate with one or more I/O devices. For example, the input device 404 may be an antenna, keyboard, mouse, joystick, (infrared) remote control, camera, card reader, fax machine, dongle, biometric reader, microphone, touch screen, touchpad, trackball, sensor (e.g., accelerometer, light sensor, GPS, gyroscope, proximity sensor, or the like), stylus, scanner, storage device, transceiver, video device/source, visors, etc. Output device 405 may be a printer, fax machine, video display (e.g., cathode ray tube (CRT), liquid crystal display (LCD), light-emitting diode (LED), plasma, or the like), audio speaker, etc. In some embodiments, a transceiver 406 may be disposed in connection with the processor 402. The transceiver may facilitate various types of wireless transmission or reception. For example, the transceiver may include an antenna operatively connected to a transceiver chip (e.g., Texas Instruments WiLink WL1283, Broadcom BCM4750IUB8, Infineon Technologies X-Gold 418-PMB9800, or the like), providing IEEE 802.11a/b/g/n, Bluetooth, FM, global positioning system (GPS), 2G/3G HSDPA/HSUPA communications, etc.

In some embodiments, the processor 402 may be disposed in communication with a communication network 408 via a network interface 407. The network interface 407 may communicate with the communication network 408. The network interface may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. The communication network 408 may include, without limitation, a direct interconnection, local area network (LAN), wide area network (WAN), wireless network (e.g., using Wireless Application Protocol), the Internet, etc. Using the network interface 407 and the communication network 408, the computer system 401 may communicate with devices 410, 411, and 412. These devices may include, without limitation, personal computer(s), server(s), fax machines, printers, scanners, various mobile devices such as cellular telephones, smartphones (e.g., Apple iPhone, Blackberry, Android-based phones, etc.), tablet computers, eBook readers (Amazon Kindle, Nook, etc.), laptop computers, notebooks, gaming consoles (Microsoft Xbox, Nintendo DS, Sony PlayStation, etc.), or the like. In some embodiments, the computer system 401 may itself embody one or more of these devices.

In some embodiments, the processor 402 may be disposed in communication with one or more memory devices (e.g., RAM 413, ROM 414, etc.) via a storage interface 412. The storage interface may connect to memory devices including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), etc. The memory drives may further include a drum, magnetic disc drive, magneto-optical drive, optical drive, redundant array of independent discs (RAID), solid-state memory devices, solid-state drives, etc.

The memory devices may store a collection of program or database components, including, without limitation, an operating system 416, user interface application 417, web browser 418, mail server 419, mail client 420, user/application data 421 (e.g., any data variables or data records discussed in this disclosure), etc. The operating system 416 may facilitate resource management and operation of the computer system 401. Examples of operating systems include, without limitation, Apple Macintosh OS X, UNIX, Unix-like system distributions (e.g., Berkeley Software Distribution (BSD), FreeBSD, NetBSD, OpenBSD, etc.), Linux distributions (e.g., Red Hat, Ubuntu, Kubuntu, etc.), IBM OS/2, Microsoft Windows (XP, Vista/7/8, etc.), Apple iOS, Google Android, Blackberry OS, or the like. User interface 417 may facilitate display, execution, interaction, manipulation, or operation of program components through textual or graphical facilities. For example, user interfaces may provide computer interaction interface elements on a display system operatively connected to the computer system 401, such as cursors, icons, check boxes, menus, scrollers, windows, widgets, etc. Graphical user interfaces (GUIs) may be employed, including, without limitation, Apple Macintosh operating systems' Aqua, IBM OS/2, Microsoft Windows (e.g., Aero, Metro, etc.), Unix X-Windows, web interface libraries (e.g., ActiveX, Java, Javascript, AJAX, HTML, Adobe Flash, etc.), or the like.

In some embodiments, the computer system 401 may implement a web browser 418 stored program component. The web browser may be a hypertext viewing application, such as Microsoft Internet Explorer, Google Chrome, Mozilla Firefox, Apple Safari, etc. Secure web browsing may be provided using HTTPS (secure hypertext transport protocol); secure sockets layer (SSL), Transport Layer Security (TLS), etc. Web browsers may utilize facilities such as AJAX, DHTML, Adobe Flash, JavaScript, Java; application programming interfaces (APIs), etc. In some embodiments, the computer system 401 may implement a mail server 419 stored program component. The mail server may be an Internet mail server such as Microsoft Exchange, or the like. The mail server may utilize facilities such as ASP, ActiveX, ANSI C++/C#, Microsoft .NET, CGI scripts, Java, JavaScript, PERL, PHP, Python, WebObjects, etc. The mail server may utilize communication protocols such as internet message access protocol (IMAP), messaging application programming interface (MAPI), Microsoft Exchange, post office protocol (POP), simple mail transfer protocol (SMTP), or the like. In some embodiments, the computer system 401 may implement a mail client 420 stored program component. The mail client may be a mail viewing application, such as Apple Mail, Microsoft Entourage, Microsoft Outlook, Mozilla Thunderbird, etc.

In some embodiments, computer system 401 may store user/application data 421, such as the data, variables, records, etc. as described in this disclosure. Such databases may be implemented as fault-tolerant, relational, scalable, secure databases such as Oracle or Sybase. Alternatively, such databases may be implemented using standardized data structures, such as an array, hash, linked list, struct, structured text file (e.g., XML), table, or as object-oriented databases (e.g., using ObjectStore, Poet, Zope, etc.). Such databases may be consolidated or distributed, sometimes among the various computer systems discussed above in this disclosure. It is to be understood that the structure and operation of the any computer or database component may be combined, consolidated, or distributed in any working combination.

The specification has described a method and a system for secure generation and transmission of data over a communication network. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A data security server (DSS) system, for secure generation and transmission, over a communication network, of data, the DSS system comprising:
   a processor;
   a memory communicatively coupled to the processor, wherein the memory stores processor-executable instructions, which, on execution, cause the processor to:
   generate a key based on a passphrase received from a user;
   receive a query from the user;
   retrieve raw data from a data repository based on the received query;
   generate an obfuscated query based on the received query and the generated key;
   randomize at least one of a table and a field of the raw data based on the generated key to produce a randomized schema;
   pre-process the raw data based on the received query, wherein the pre-processing does not exceed a user-defined threshold of execution of the received query;
   insert the preprocessed data into the randomized schema; and
   generate a data payload by inserting the obfuscated query and the randomized schema into a data carrier, wherein the data payload is to be transferred to at least one client device for processing and wherein the data carrier comprises one or more data packets.

2. The DSS system as claimed in claim 1, wherein the instructions, on execution, further cause the processor to:
   segment the pre-processed data; and insert the segmented data into the data carrier for generating the data payload.

3. The DSS system as claimed in claim 1, wherein the instructions, on execution, further cause the processor to:
receive a distribution list for a document, wherein the distribution list comprises identifiers of at least one of a client user and the client device authorized to access the data by processing the payload;
generate an access control list, based on the distribution list, wherein the access control list includes a first sub-list for access allowed white-list and a second sub-list for access disallowed black-list; and
insert the access control list to the data payload.

4. The DSS system as claimed in claim 1, wherein the instructions, on execution, further cause the processor to:
generate at least one of an access violation policy and a document destruction policy, based on pre-defined data security rules received from the user; and
insert at least one of the access violation policy and the document destruction policy to the data payload.

5. The DSS system as claimed in claim 1, wherein the instructions, on execution, further cause the processor to:
generate a master script template, wherein the master script template is indicative of the query which is to be executed by the at least one of the client user and the client device, the document protection rules to be implemented by the at least one of the client user and the client device, and the intrusion detection rules to be implemented by the at least one of the client user and the client device; and
insert the master script template to the data payload.

6. A data security client (DSC) system for secure generation and transmission, over a communication network, of data, the DSC system comprising:
a processor;
a memory communicatively coupled to the processor, wherein the memory stores processor-executable instructions, which on execution cause the processor to:
receive a data payload;
receive a secure passkey from a client user;
process the data payload to extract an obfuscated query and data from the data payload wherein at least one of a table and a field of the data is randomized;
decipher an executable query from the obfuscated query based on the secure passkey;
restructure the data, based on the secure passkey, by reconstructing at least one of the table and at least one of the field of the data which is randomized;
execute the executable query on the restructured data to generate a document; and
provide at least one of a client user and the client device with an access of the document.

7. The DSC system as claimed in claim 6, wherein the instructions, on execution, further cause the processor to:
process the data payload to extract an access control list wherein the access control list includes an access allowed white-list, and an access disallowed black-list of the client users authorized to access the document; and
provide access of the document based on the access control list.

8. The DSC system as claimed in claim 6, wherein the instructions, on execution, further cause the processor to:
extract at least one of an access allowed white-list and an access disallowed black-list from the access control list; and provide the access of the document to one or more client users mapped on the white-list; and
deny the access of the document to one or more client users mapped on the black-list.

9. The DSC system as claimed in claim 6, wherein the instructions, on execution, further cause the processor to:
count the number of times an unauthorized attempt to access the document is made by the one or more client users;
securely delete, by a plurality of sector overwrites, the document on the number of unauthorized attempts exceeding a pre-defined threshold.

10. A computer implemented method of secure generation and transmission, over a communication network, of data, the method comprising:
generating, by a data security server system, a key based on a passphrase received from a user;
receiving, by the data security server system, a query from the user;
retrieving, by the data security server system, raw data from a data repository based on the received query;
generating, by the data security server system, an obfuscated query based on the received query and the generated key;
randomizing, by the data security server system, at least one of a table and a field of the raw data based on the generated key to produce a randomized schema;
pre-processing, by the data security server system, the raw data based on the received query, wherein the pre-processing does not exceed a user-defined threshold of execution of the received query;
inserting, by the data security server system, the preprocessed data into the randomized schema; and
generating, by the data security server system, a data payload by inserting the obfuscated query and the randomized schema into a data carrier, wherein the data payload is to be transferred to at least one client device for processing and wherein the data carrier comprises one or more data packets.

11. The method as claimed in claim 10, wherein the method further comprises:
segmenting, by the data security server system, the pre-processed data; and
inserting, by the data security server system, the segmented data into the data carrier for generating the data payload.

12. The method as claimed in claim 10, wherein the method further comprises:
receiving, by the data security server system, a distribution list for a document, wherein the distribution list comprises identifiers of at least one of a client user and the client device authorized to access the data by processing the payload;
generating, by the data security server system, an access control list, based on the distribution list, wherein the access control list includes a first sub-list for access allowed white-list and a second sub-list for access disallowed black-list; and
inserting, by the data security server system, the access control list to the data payload.

13. The method as claimed in claim 12, wherein the method further comprises:
generating, by the data security server system, at least one of an access violation policy and a document destruction policy, based on pre-defined data security rules received from the user; and inserting, by the data security server system, at least one of the access violation policy and the document destruction policy to the data payload.

14. The method as claimed in claim 10, wherein the method further comprises:
generating, by the data security server system, a master script template, wherein the master script template is indicative of the query which is to be executed by the at least one of the client user and the client device, the document protection rules to be implemented by the at least one of the client user and the client device, and the intrusion detection rules to be implemented by the at least one of the client user and the client device; and
inserting, by the data security server system, the master script template to the data payload.

15. A computer implemented method of secure generation and transmission, over a communication network, of data, the method comprising:
receiving, by a data security client system, a data payload;
receiving, by the data security client system, a secure passkey from a client user;
processing, by the data security client system, the data payload to extract an obfuscated query and data from the data payload wherein at least one of a table and a field of the data is randomized;
deciphering, by the data security client system, an executable query from the obfuscated query based on the secure passkey;
restructuring, by the data security client system, the data, based on the secure passkey, by reconstructing at least one of the table and at least one of the field of the data which is randomized;
executing, by the data security client system, the executable query on the restructured data to generate a document; and
providing, by the data security client system, at least one of a client user and the client device with an access of the document.

16. The method as claimed in claim 15, wherein the method further comprises:
processing, by the data security client system, the data payload to extract an access control list wherein the access control list includes an access allowed white-list, and an access disallowed black-list of the client users authorized to access the document; and
providing, by the data security client system, access of the document based on the access control list.

17. The method as claimed in claim 16, wherein the method further comprises:
extracting, by the data security client system, at least one of an access allowed white-list and an access disallowed black-list from the access control list; and
providing, by the data security client system, the access of the document to one or more client users mapped on the white-list; and
denying, by the data security client system, the access of the document to one or more client users mapped on the black-list.

18. The method as claimed in claim 15, wherein the method further comprises:
analyzing the data payload to determine a designated deadline associated with the data payload;
comparing the designated deadline with a current timestamp of the at least of the data security client system and the client devices, to determine whether the designated deadline has been violated; and
securely deleting at least one of the data payload and the document in determining the designated deadline to have been violated.

19. The method as claimed in claim 15, wherein the method further comprises:
counting, by the data security client system, the number of times an unauthorized attempt to access the document is made by the one or more client users;
on the number of unauthorized attempts exceeding a predefined threshold, securely deleting the document.

* * * * *